(12) United States Patent
Dvortsov et al.

(10) Patent No.: US 10,459,887 B1
(45) Date of Patent: Oct. 29, 2019

(54) PREDICTIVE APPLICATION PRE-LAUNCH

(71) Applicant: APPLE INC., Cupertino, CA (US)

(72) Inventors: Eugene Dvortsov, San Francisco, CA (US); Austen J. Green, Campbell, CA (US); Brent W. Schorsch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 14/710,444

(22) Filed: May 12, 2015

(51) Int. Cl.
| | |
|---|---|
| G06F 3/0481 | (2013.01) |
| G06F 3/0482 | (2013.01) |
| G06F 3/0484 | (2013.01) |
| G06F 16/172 | (2019.01) |

(52) U.S. Cl.
CPC .......... G06F 16/172 (2019.01); G06F 3/0482 (2013.01); G06F 3/04817 (2013.01); G06F 3/04842 (2013.01)

(58) Field of Classification Search
None
See application file for complete search history.

(56) References Cited

U.S. PATENT DOCUMENTS

| | | | |
|---|---|---|---|
| 8,621,395 B2 | 12/2013 | Bau | |
| 8,935,610 B2 | 1/2015 | Costenaro et al. | |
| 9,529,509 B1* | 12/2016 | Schmidt | ............. G06F 3/04842 |
| 2007/0186177 A1* | 8/2007 | Both | ................... G06F 3/04817 |
| | | | 715/764 |
| 2013/0120294 A1* | 5/2013 | Sun | ......................... G06F 3/041 |
| | | | 345/173 |
| 2013/0222329 A1 | 8/2013 | Larsby | |
| 2013/0346896 A1 | 12/2013 | Missout | |
| 2014/0267130 A1 | 9/2014 | Hwang | |
| 2014/0280433 A1* | 9/2014 | Messerli | ................. H04L 67/06 |
| | | | 709/201 |
| 2015/0324078 A1* | 11/2015 | Dipin | ..................... G08C 17/02 |
| | | | 715/765 |
| 2015/0345068 A1* | 12/2015 | Coffman | ................. D06F 58/28 |
| | | | 715/771 |

FOREIGN PATENT DOCUMENTS

EP        2648087 A2 * 10/2013   ........... G06F 3/0488

* cited by examiner

*Primary Examiner* — Nhat Huy T Nguyen
(74) *Attorney, Agent, or Firm* — Kilpatrick, Townsend and Stockton LLP

(57) ABSTRACT

Embodiments can provide a portable computing device for pre-launching an application upon predicting that the application may be an application desired to be launched by a user. One or more application pre-launch criteria for an icon may be determined to have been satisfied when the icon is within a specified region of a display. Pre-launching the application can include loading the application into working memory while not presenting an interface associated with the application on the display of the portable computing device. When a selection of the icon is received, an interface associated with the application can be presented on the display of the portable computing device using the loaded application.

21 Claims, 8 Drawing Sheets

PREDICTIVE APPLICATION PRE-LAUNCH

BACKGROUND

The present disclosure relates generally to portable electronic devices, and in particular to portable electronic devices that can launch an application. Portable electronic devices may have the capability to present one or more icons representing applications on a home screen of the portable electronic devices. In response to a user selection of an icon, portable electronic devices may launch an application corresponding to the selected icon. In some instances, significant load time may be required for an application to be launched on the portable electronic devices. User experience is diminished quickly as the users spend more time waiting for the application to launch and become available for user input.

It is also difficult for users to obtain desired information from multiple applications quickly. In order to obtain application content, users are required to launch the application where the application's interface occupies the full screen of portable computing devices. When users desire to retrieve information from multiple applications, the portable electronic devices launch each application sequentially where each application's interface is displayed in full screen mode one after another. The amount of time it takes to launch each application where each application's interface is displayed in full screen mode and also to switch between the applications' full screen interfaces in order to provide the user with the desired information can be cumbersome.

BRIEF SUMMARY

Some embodiments of the present invention can pre-launch (also referred to as background launch) an application on a portable computing device upon satisfying one or more pre-launch criteria (e.g., an application icon being within a pre-specified region of an interface, an application icon being of a certain size or zoom level). Pre-launching an application can cause the application to be launched in the background (e.g., loaded into memory) without launching the application to the foreground and thereby presenting the application's interface to the user. In some embodiments, a prediction engine of the portable computing device can determine to pre-launch an application corresponding to an icon that is in a particular location or a specified region of the display (e.g., closest to center of the watch or within any threshold distance of center). In certain embodiments, the prediction engine may determine to pre-launch an application corresponding to an icon that has particular size (e.g., is the largest icon in the array of icons or is above a threshold size or zoom level). In some instances, the prediction engine may make the pre-launch determination after the portable computing device detects a panning gesture on a screen of the portable computing device and when the panning gesture ceases.

In some embodiments, a pre-launch operation for the icon is triggered when the portable computing device detects that the icon has entered the specified region and is within the specified region of the display for beyond a threshold period of time. The application can be pre-launched without requiring any user intervention or any further input from the user (e.g., a tap on the icon, a selection or turning of the crown of the device). As the application has already been pre-launched, the application interface may be displayed to the user much faster when the user finally makes the indication to launch the application than if the application had not been previously pre-launched. For example, upon receiving the user indication to launch the application (e.g., a double-tapping on the application's icon, a clockwise turning of the crown), an application's interface for a pre-launched application may be presented to the user milliseconds, seconds, or minutes faster than if the application was not pre-launched. User experience is drastically improved as the appearance of the application launch time has been decreased. In some embodiments, multiple applications can be pre-launched at the same time. Certain embodiments may suspend one or more background launched applications until an activation to foreground launch the application has been received.

Some embodiments may allow an app (also referred to as application throughout this disclosure) to take over drawing its corresponding icon with contextual information from the operating system (also referred to as a system app) when a set of conditions have been satisfied. For example, based on the size and/or a location of the icon, the portable computing device may transfer control for drawing an app's icon from the system app to the app itself. While the system app may draw the icon when the icon size is below a threshold size, the app may generate the icon when the icon size is above the threshold size. In some embodiments, the set of conditions may be satisfied when the icon is at the center of a display screen and beyond a threshold zoom level. Transfer of control can occur based solely on the icon being at the center of the display screen, based solely on the icon having at least a threshold zoom level, or both.

In certain embodiments, transfer of control can occur when only a subset of icons (e.g., 5 icons) is being displayed on the screen of the portable computing device where the subset of icons is being displayed at beyond a threshold zoom level. A prediction engine may pre-launch one or more applications corresponding to one or more icons (e.g., a center icon, the subset of icons) and allow the one or more applications to draw themselves, e.g., display a next appointment for a calendar app or display a number of e-mails and senders for an e-mail app. In some embodiments, larger sizes above the threshold can lead to more and more information to be drawn on the icon and displayed. For instance, if the icon is at zoom level 70%, then the application may draw more information than if the icon were at zoom level 50%. In certain embodiments.

The following detailed description together with the accompanying drawings will provide a better understanding of the nature and advantages of the present invention.

DETAILED DESCRIPTION

Aspects of the present disclosure can provide systems, devices, methods, and computer-readable medium for pre-launching an application upon determining that an icon associated with the application has satisfied one or more pre-launch criteria. In some embodiments, the pre-launch criteria can include the icon being within a region of a graphical interface of a computing device or the icon having a size exceeding a threshold value. For instance, the pre-launch criteria for an icon can be satisfied when the icon has been in the center of an array of icons for beyond a threshold time period (e.g., 1 second). Upon determining that the pre-launch criteria for the icon have been satisfied, the computing device may pre-launch the application corresponding to the icon in advance of the user indicating his or her desire to launch the application. Pre-launching the application can include loading the application content into the working memory of a computing device without displaying on a display of the computing device an interface associated with the application. In response to receiving the user indication to launch the application, the computing device may display the application interface more quickly to the user than if the application had not been pre-launched or pre-loaded into working memory.

In some embodiments, after an application is pre-launched, the application can provide the user a preview of application information via a drawn icon. Aspects of the disclosure can also provide systems, methods, and computer-readable medium for determining when to hand off the responsibility of generating a representation of an application (e.g., drawing an icon) from the system of a computing device to an individual application. In some embodiments, the responsibility for drawing an icon can be switched from the system to the application associated with the icon when a set of criteria have been satisfied. In certain embodiments, the set of criteria can include a threshold zoom level for the icon and a location of the icon. For instance, the responsibility of drawing a mail app can be switched from the system app to the mail app itself when 1) the mail app icon is being displayed at 170% of the size of when the icons are being displayed in a default state, and 2) the mail app icon is currently in the center of the array of icons being displayed on the graphical interface. Upon determining that the set of criteria have been satisfied, the system app sends the zoom level information to the application. The application then determines the relevant application information to present to the user using the zoom level information and generates and displays the drawn icon.

Various embodiments will now be discussed in greater detail with reference to the accompanying figures, beginning with FIG. 1.

I. Application Pre-Launch System Overview.

Figure 1:
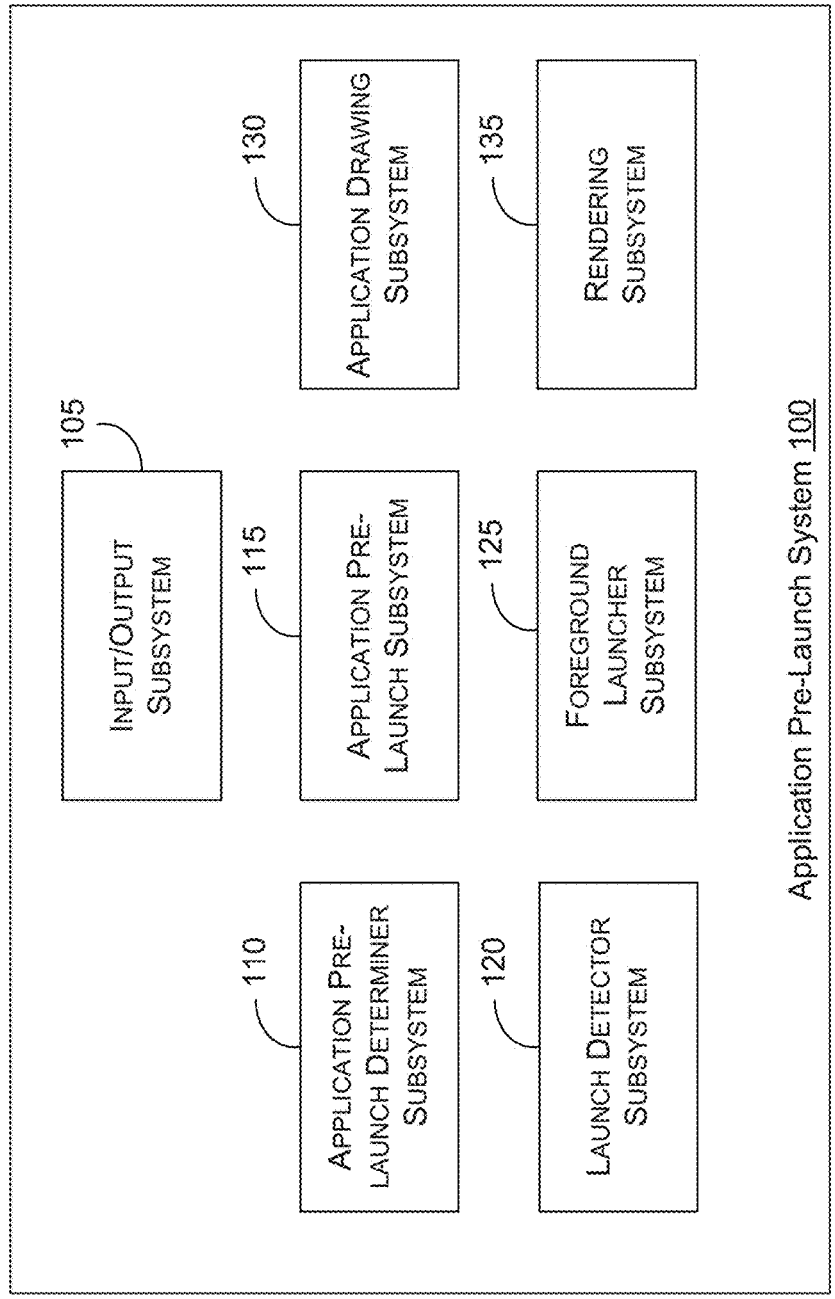
FIG. 1 illustrates a simplified diagram of an application pre-launch system according to one or more embodiments of the present invention.

FIG. 1 illustrates a simplified diagram of an application pre-launch system 100 according to one or more embodiments of the present invention. In some embodiments, system 100 can include multiple subsystems including an input/output ("I/O") subsystem 105, an application pre-launch determiner subsystem 110, an application pre-launch subsystem 115, a launch detector subsystem 120, a foreground launcher subsystem 125, an application drawing subsystem 130, and a rendering subsystem 135. One or more communication paths may be provided that enable the subsystems to communicate with and exchange data with each other. The subsystems may be implemented in software, hardware, or a combination thereof. In certain embodiments, the software may be stored on a non-transitory computer-readable storage medium and executed by one or more processors.

In some embodiments, input/output ("I/O") subsystem 105 may provide an interface that allows a user to interact with system 100. For instance, I/O subsystem 105 may include a display component such as a screen of a portable computing device that can output information to a user. I/O subsystem 105 may also include an input device such as a touch-sensitive surface or touchscreen that can receive input commands from a user. I/O subsystem 105 may display a default home screen where an array of icons can be displayed to the user. I/O subsystem 105 may receive one or more user selections via the touch-sensitive display screen, such as a selection of an icon in the array of icons, to indicate the user's desire to launch an application. I/O subsystem 105 may also receive a user input corresponding to a desire to zoom into a region within the graphical interface. I/O subsystem 105 may also receive user input corresponding to a panning gesture that causes an array of icons to be moved across a graphical interface of a computing device.

In certain embodiments, application pre-launch determiner subsystem 110 (also referred to as launch prediction engine 110) can determine that an icon has satisfied the application pre-launch criteria. Different embodiments may have a different set of application pre-launch criteria to be satisfied before an application is pre-launched. For instance, the application pre-launch criteria can include a location criterion, a size criterion, a time interval criterion, or a combination thereof. Some embodiments may determine that an icon that is within a specified region of the display (e.g., the center of the display) for beyond a threshold period of time (e.g., half a second) may correspond to an application predicted to be launched by a user. The icon that is in the center of the display may be an icon that overlaps a single point at the center of the display screen or an icon that overlaps an area surrounding the center of the display screen (e.g., within a 1 cm radius or 20-pixel radius from the center of the display screen, within a 1 cm×1 cm square around the center of the display screen). Upon determining that one or more icons have satisfied the application pre-launch criteria and are thus the application(s) predicted to be launched by a user, application pre-launch determiner subsystem 110 can inform application pre-launch subsystem 115 of the application(s) to pre-launch.

Application pre-launch subsystem 115 (also referred to as application pre-launch engine 115) can pre-launch the one or more applications corresponding to the one or more icons as determined by launch prediction engine 110. Pre-launch engine 115 may load the components of the application into working memory such that the application is running and updated without the interface of the application being displayed in the foreground. The application in the pre-launched state can also be referred to as being in a background launched state throughout this disclosure. An application in its pre-launched or background launched state can be quickly presented to the user in the foreground of the graphical interface when the user indicates that the user would like to view the contents of the application. Application launch time can appear to much shorter to a user when the application has been pre-launched than if the application had not been pre-launched. The launch time for the application (sometimes also referred to as app load time) can be measured as the time interval between the app icon being tapped and when the app becomes available for user input.

In some embodiments, launch detector subsystem 120 can determine whether another user input corresponding to the launching of the application has been received. In response to determining that a user input corresponding to a launch command has been received, launch detector subsystem 120 may instruct foreground launcher subsystem (also referred to as foreground launch engine 125) to launch the application. The user input corresponding to a launch command can be a gesture input that corresponds to another selection or tap on the icon that is within a region of the graphical interface. The user input corresponding to a launch command can also be a twisting of the crown of the computing device that also corresponds to a zoom-in command.

In certain embodiments, foreground launcher subsystem 125 (also referred to as foreground launch engine 125) can launch the application. Foreground launch engine 125 may cause a background launched application to be brought to the foreground and presented to the user via the graphical interface. Foreground launch engine 125 may cause the application to be presented at 100% of the graphical interface such that the entire screen is now occupied by the application that has been foreground launched. When the foreground launch mode is activated for an application program, the application's interface is visible to the user and capable of interacting with the user via a graphical user interface.

In some embodiments, application drawing subsystem 130 can retrieve information items and draw relevant information around an icon. Application drawing subsystem 130 may determine whether to hand off the responsibility for generating an icon to an application. The system application typically generates the icons for presentation to a user on for example a home screen of a device. In certain embodiments, the responsibility for generating the icon may be switch from the system to the application when a set of conditions have been satisfied. Application drawing subsystem 130 can determine when the set of conditions have been satisfied and allows the application to generate a contextualized or "decorated" icon. The contextualized icon may be generated using application information retrieved from application servers or other servers. In some embodiments, the contextualized information can only be retrieved when an application has been loaded into working memory (pre-launched or launched). Further, application drawing subsystem 130 may allow an application corresponding to an icon in a specified region (e.g., the center of the display) to generate its contextualized icon.

In some embodiments, rendering subsystem 135 may enable system 100 to render graphical user interfaces and/or other graphics. For example, rendering subsystem 135 may operate alone or in combination with the other subsystems of system 100 in order to render one or more of the user interfaces displayed by system 100. This may include, for instance, communicating with, controlling, and/or otherwise causing I/O subsystem 100 to display and/or update one or more images on the touch-sensitive display screen included in I/O subsystem 105. For example, rendering subsystem 135 may draw and/or otherwise generate one or more images of one or more icons to be displayed on a display of a device. Additionally or alternatively, rendering subsystem 135 may render an application interface based upon information received from foreground launcher subsystem 135. Rendering subsystem 135 may also draw one or more contextualized icons based on information received when the corresponding application(s) are pre-launched by application pre-launch subsystem 115. In some embodiments, rendering subsystem 135 may periodically poll the other subsystems of system 100 for updated information in order to update the contents of the one or more user interfaces displayed by system 100. In additional and/or alternative embodiments, the various subsystems of system 100 may continually provide updated information to rendering subsystem 135 so as to update the contents of the one or more user interfaces displayed by system 100.

It should be appreciated that system 100 may include other components than those depicted in FIG. 1. Further, the embodiment shown in FIG. 1 is only one example of a system that may incorporate an embodiment of the invention. In some other embodiments, system 100 may have more or fewer components than those shown in FIG. 1, may combine two or more components, or may have a different configuration or arrangement of components. In some embodiments, system 100 may be part of a portable computing device, such as a wearable smart watch, a mobile telephone, a smart phone, or a multifunction device. In some embodiments, system 100 may also be incorporated in other devices such as desktop computers, kiosks, and the like.

II. Sequence of Triggering a Pre-Launch and Launching

Figure 2:
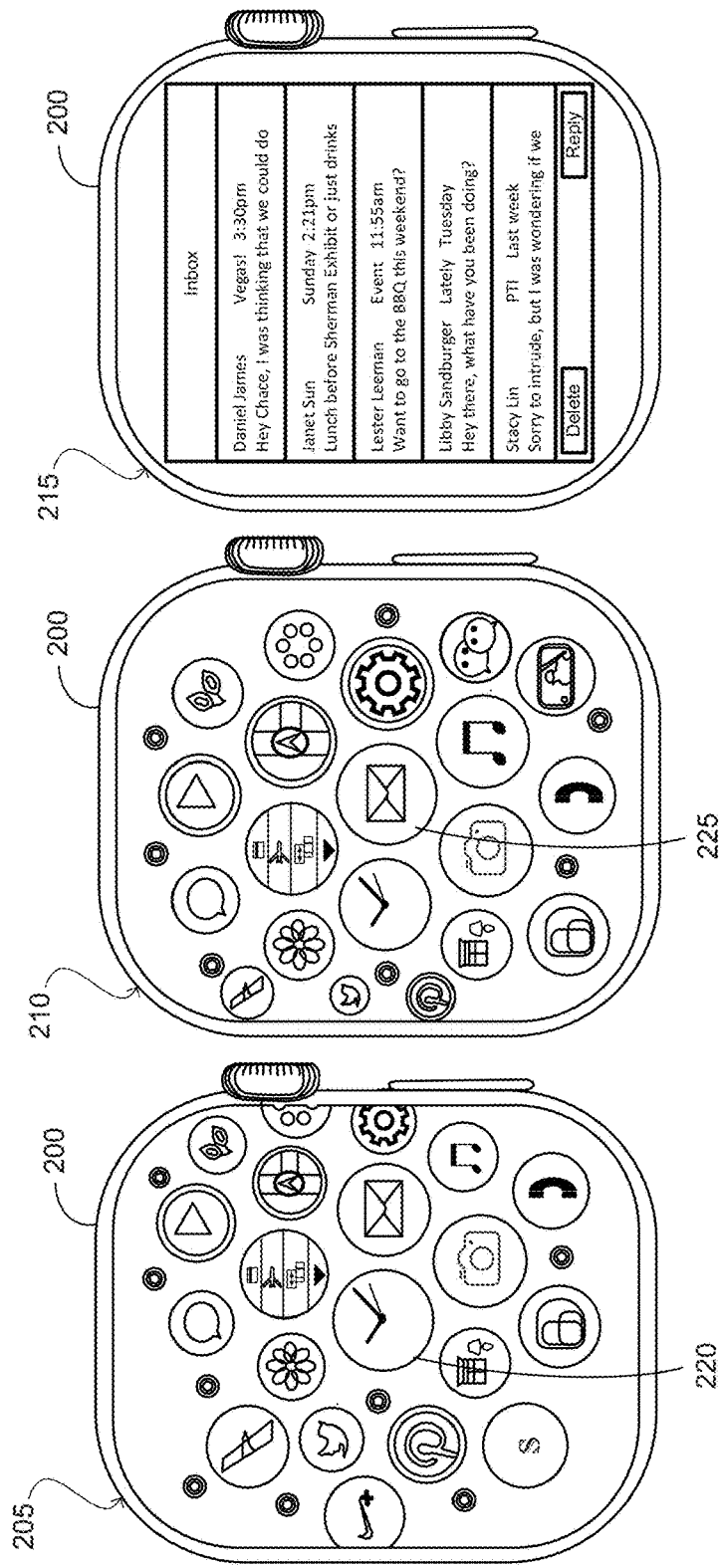
FIG. 2 illustrates an example sequence of triggering a pre-launch of an application and then the launching of the application in accordance with some embodiments of the present invention.

FIG. 2 illustrates an example sequence of stages 205-215 of triggering a pre-launch of an application and then the launching of the application on a portable computing device 200 in accordance with some embodiments of the present invention. As described, a portable computing device can predict that a user may want to launch an application based on a set of application pre-launch criteria. Upon predicting that the user may desire to launch an application, the device may pre-launch the application in advance of the user indicating his or her desire to launch the application. As such, upon receiving the user indication to launch the application, the computing device may present the associated interface of the application more quickly to the user than if the application had not been pre-launched or pre-loaded into working memory.

Stage 205 illustrates a user interface that includes an array of icons being displayed on a home screen in default mode. In certain embodiments, the array of icons can each represent an application. The icons can be displayed in different shapes, sizes, and colors. In some embodiments, a clock icon 220 is displayed in the center of the array of icons when the device is in default mode. In certain embodiments, the array of icons may be presented to the user when the user has indicated to display the home screen (e.g., by tapping anywhere on the display, by raising the watch to a position where the user may view the screen, by pressing on the digital crown). The user may then pan across the home screen to find the application that the user desires to interact with and select the application icon to foreground launch the application.

In some embodiments, the full array of icons may be on a virtual surface or a virtual page where only a portion of the array of icons (less than the full array in some instances) may be displayed via a graphical user interface on the display screen. As the user pans around the array of icons, some icons that are not visible on the display screen may appear onto the display screen and some icons that were visible may be moved off of the display screen. The icons on the virtual surface may be fluidly panned onto the screen and off the screen depending on the movement of the user's panning gesture. As the user pans across the display screen, different icons are moved across the screen and different icons may be fluidly moved into and out of a specified region (e.g., the center of the display screen).

Stage 210 illustrates the user interface after the user interface has been panned to the left. The icons can be shifted (e.g., to the left) to an extent corresponding to the amount of panning that was done. As shown, clock icon 220 is no longer in the center and has been shifted to the left. E-mail icon 225 that was previously to the right of the center is now in the center of the display screen. Some embodiments may pre-launch an application corresponding to an icon that is within a specified region of the display screen, such as mail icon 225 that is at the center of the display screen. Icons within the vicinity have also been shifted to the left. The sizes of the icons may change as the icons are shifted. As the icons are panned to the left, certain icons that were part of a page containing all the icons may now appear on screen while some icons that were on the left of the display screen may fall off of the display screen.

The user interface may be panned to the left upon receiving a user input corresponding to a panning gesture where the user has pressed against the touch-sensitive display and dragged his finger to the left to cause the icons to shift to the left. The amount of panning corresponds to the magnitude of the user input. As the icons fluidly shift to the left, different icons are displayed on the user interface and a different icon may be in the center (or closest to the center). The proximity to the center of the user interface can be measured based on a center point of each icon.

After the user stops panning (e.g., by lifting the finger from the display screen for more than a threshold time interval), the icons settle into positions on the display screen or specific grid locations. When the icons are settled into their current positions on the display screen, they are no longer moving and each has a specific coordinate within the grid space. In some embodiments, after the user has stopped panning, the icons settle into positions where the centermost icon settles into or snaps to the center of the display screen. In certain embodiments, the icons stop moving after the user stops panning and the icons stay in their positions. There may be no icons that are in the exact center location of the display screen in certain embodiments.

As described, the portable computing device may predict the application that the user will want to launch. In some embodiments, the computing device may determine that the application that the user will want to launch corresponds to the application icon that is in a certain region or at a specified or particular location within the display screen (e.g., the center of the display screen, an upper left corner of the display screen). The region of interest on the display screen may be pre-specified by a system administrator or may be configurable by a user (e.g., via a preferences setting) or by the system administrator. In some embodiments, the icon that is within the region of interest after the icons have settled may be the predicted desired application. The system may pre-launch the application whose icon has been within the specified region for more than a threshold time period.

In certain embodiments, the computing device may determine that the application that the user will want to launch is the application whose corresponding icon has a certain size (e.g., a size that is beyond a threshold (e.g., 5 mm) diameter, a size that is beyond a threshold zoom level, a size that is a threshold percentage larger than the standard default size, a size that is larger than the size of neighboring icons). The size of the icon may be measured by the number of pixels that the icon occupies on the screen in certain embodiments. Some embodiments may pre-launch the application that the computing device has predicted to be the application that a user desires to launch prior to receiving a user indication to launch the application. When an application is pre-launched, its contents may be loaded into working memory of a computing device without its associated interface being presented to a user on a display of the computing device.

Stage 215 illustrates user interface displaying the contents of mail app 225 after the device has received a user indication to launch the app. As described, the user indication to launch the app can include a selection of the app that was in the selection region (e.g., via a tap, via a double tap). The user indication to launch the app can also include a scrolling of the digital crown in some embodiments. Different embodiments may include different mechanisms to indicate a user's desire to launch an app. As shown in this example, upon receiving the user indication to launch the app, the device launches the pre-launched app into the foreground of the user interface.

III. Flow Chart for Pre-Launching

Figure 3:
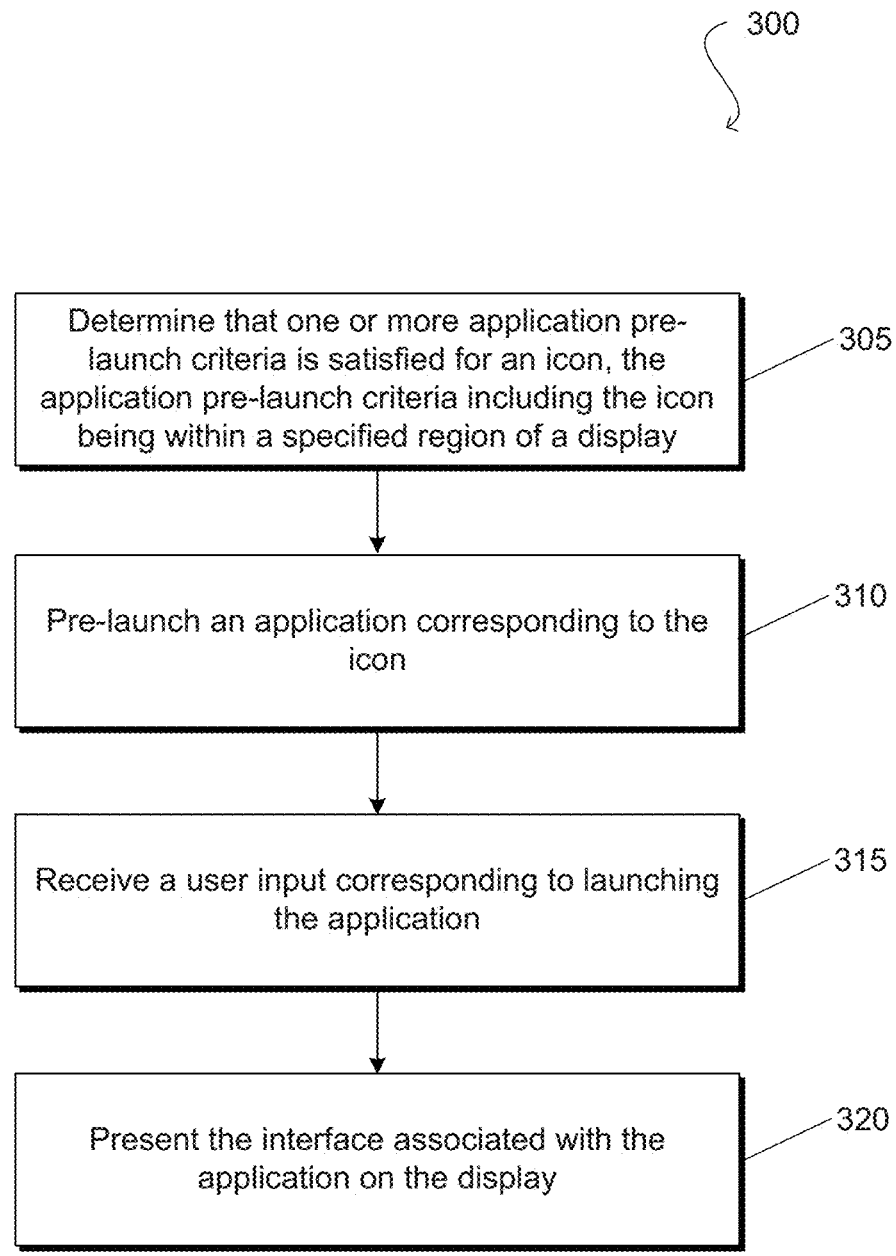
FIG. 3 illustrates an example process for triggering a pre-launching of an application and then launching the application.

FIG. 3 illustrates an example process 300 for triggering a pre-launching of an application and then launching the application. Process 300 may be performed by software (e.g., instructions or code modules) when executed by a central processing unit (CPU or one or more processors) of a logic machine, such as a computer system or information processing device, by hardware components of an electronic device or application-specific integrated circuits, or by combinations of software and hardware elements.

As described, a portable computing device may predict one or more applications that a user would desire to launch and trigger the pre-launch of those applications in advance of receive a user indication to launch the application. By pre-launching those applications predicted to be desired to be launched by the user, the user experience is improved by speeding up the presentation of an application interface upon receiving the user's signal to launch the application. The components of the application (e.g., libraries, extensions, variables on the stack, etc.) are loaded and the application may be initialized during pre-launch such that the application is ready and only needs to be brought to the foreground once the user indicates the desire to use an application.

As seen in FIG. 2, a user may pan around a multitude of application icons (also referred to as application bubbles) to find an application that the user desires to interact with. When the device detects that the user has stopped panning (e.g., by detecting a slowing in velocity in the panning movement, by detecting a speed and acceleration in which the icons are being moved across the screen, by detecting that the icons are no longer moving), the icons settle. The icons may settle by snapping into a grid such that there is always an icon in the center of the screen. The icons may settle in their current locations when the panning stops. As the icon movement across the screen may be fluid, there may not be an icon exactly in the center of the screen when the panning movement stops. In some embodiments, the device may predict the application(s) that the user would desire to launch. Some embodiments may predict that the centermost icon is the application that the user desires to launch. The pre-launching criteria may thus be the icon that is in the center of the screen or is the icon that is closes to the center of the screen (e.g., measured by the center of the icon or by an edge closes to the center of the screen). The application may be triggered to be pre-launched when a set of application pre-launching criteria have been satisfied.

At block 305, process 300 can determine that one or more application pre-launch criteria is satisfied for an icon. In some embodiments, the application pre-launch criteria can include the icon being within a specified region (e.g., a center, a pre-identified corner, within a range of grid coordinates) of the display. The device may determine that the application icon satisfying the pre-launch criteria is the application that the user desires to interact with. In certain embodiments, the icon that is within the specified region may be highlighted, enlarged, or notated in a way such that the user is able to easily and quickly distinguish the application within the particular specified region. In some embodiments, the application icon for the application being pre-launched does not appear to be visibly different from when the application was not pre-launched. As such, the user experience may be improved when the application appeared to the user as having been launched quickly (without the user knowing that the application was already pre-launched in the background).

As shown in stage 210 in FIG. 2, the device determines that the icon (mail icon 225 in FIG. 2) in the centermost position or region of the user interface satisfies the pre-launch criteria. Some embodiments may determine the centermost icon by computing the distance between the center of the icon and the center of the user interface. The icon with the shortest distance between the center of the icon and the center of the user interface may be the determined to be the centermost icon. Certain embodiments may determine the centermost icon by computing the distance between the edges of the icon and the center of the user interface. In those embodiments, the centermost icon may be the icon that has the shortest distance between an edge of the icon and the center of the user interface. In some embodiments, in connection with the location of the icon, user data such as user behavior may also be used as an additional trigger. For instance, the pre-launch criteria may be satisfied when the icon is occupying a certain pre-specified location and when the user's past behavior or activities indicate that the user has a habit of launching a particular application at a certain hour (e.g., mornings at 10 AM).

While in some embodiments, an icon within a particular region (e.g., the center) may represent the application that the user is most likely to launch, some embodiments may have other or additional ways to show an icon that is in focus and likely representing the application that the user is most likely to launch. For example, some embodiments may highlight or magnify an icon within a particular region of the screen (e.g., a corner of the screen, an area that is off center of the screen). As the user pans across the array of icons, the icon that falls within the particular region may constantly be shifting from one icon to another, constantly bringing a different icon "into the spotlight" or "under the magnifying glass." When the user stops panning, the icon that is within the particular region or "under the magnifying glass" may then be determined to correspond to the application that the user will likely desire to launch. As such, the criteria for pre-launching may include the icon that settles within a particular region of the screen, or that is highlighted or enhanced, or that is magnified or zoomed in to beyond a threshold size.

In certain embodiments, the application pre-launching criteria can include one or more of a size criterion, a zoom level criterion, a position criterion, or an eye level detection criterion (i.e., detecting that the user's gaze is directed at a particular icon or that the user is looking at the particular icon), or a combination thereof. Different embodiments may have different set of application pre-launching criteria that need to be satisfied to trigger the pre-launch operation.

Some embodiments may determine that multiple icons satisfy the pre-launch criteria simultaneously. For instance, two icons can be determined to have satisfied the pre-launch criteria when both are equally close to the center of the screen.

In certain instances where there is limited real estate on a display screen of a device (e.g., a watch with a small touchscreen), the user needs to be fairly precise with his selection of an icon when using touch against the touchscreen. The system may determine whether an icon has satisfied a set of pre-launch criteria by detecting icon movement across the screen while the user pans across the screen without having to make specific selections. In some embodiments, the determination as to whether an icon has satisfied a set of criteria is made by detecting the icon movement on the screen (from a panning by the user) and not by detecting a user's finger movement or cursor movement (e.g., via a camera or a pressure or touch sensor). Upon detecting one or more icons moving into and settling into a specified region (without the user physically touching the icon or selecting the icon), the system may determine to launch the one or more applications corresponding to those icons. The user need not make a gesture or cursor movement towards a specific icon in those embodiments in order for the icon to be a candidate for pre-launch. As described, the specified region may be limited to an icon at the center of the display screen or may be a predetermined region around the center of the display screen (e.g., within a threshold radius of the center).

At block 310, process 300 can pre-launch (also referred to as background launch) an application corresponding to the icon. As described, when an application is pre-launched, the process is similar to when an application is being launched less bringing the interface of the application to the foreground. The user interface of the application is not presented but the application is loaded into working memory and initialized. In some embodiments, the application retrieves any updates or information items necessary for the application to function properly (i.e., as if the application were a fully launched app) from an application server without presenting the updates or information items to the user in the foreground of the user interface. The updates may include information items that are new compared to a last time the application was launched or loaded. In some embodiments, the pre-launch operation may not be made visible or noticeable to the user. The pre-launched application is also not made visible to the user in certain embodiments.

When an application is pre-launched or background launched, the device merely needs to bring the application to the foreground for the user to be able to interact with the application (also referred to as foreground activating the application). By pre-launching an application, the application may be presented and ready for interaction quicker when the user indicates to launch the application than if the application had not been pre-launched. For instance, the application's interface (e.g., a welcome screen) can be presented in the foreground and ready for interaction a microsecond, a second, or several seconds faster than the instance where the application had not been pre-launched. While the application interface may not yet be visible to the user, the pre-launched application may be quicker to present its interface and be ready for interaction with a user than a non-pre-launched application because the application components have already been pre-loaded into memory. For instance, the libraries have already been loaded into memory, the code has been initiated, etc. Certain embodiments may pre-launch multiple applications at the same time. For example, some embodiments may pre-launch two applications that have icons with equally short distances to the center of the user interface.

At block 315, process 300 can receive a user input corresponding to launching the application. In some embodiments, the user input can be a selection of the icon of the pre-launched application (e.g., via a tap on the screen). In certain embodiments, the user input can be a turning of the digital crown or another input device that is coupled to the device or that is a part of the device. When the user is turning the digital crown, the interface may zoom into the icon of the pre-launched application and cause the pre-launched application to launch when the interface has zoomed into the icon beyond a threshold zoom level. For instance, the device may determine that the user has indicated to launch an application if the zoom level of the interface has exceeded a threshold zoom level (e.g., 150% of the zoom level of the interface when the home button has been selected). In another instance, if the zoom level has increased such that the icon size exceeds 150% of the icon's default size (i.e., the size of the icon when the device is in default mode or when the icon is being displayed as part of the home screen as a home screen icon e.g., when the home button has been selected), the device may determine that a user indication to launch the application has been received. Different embodiments may have different mechanisms that enable a user to signal to launch an application. For instance, some embodiments may include a separate launch button that signals the user's desire to launch a particular application when pressed or toggled. Upon receiving a user indication to launch a pre-launched application, the device may present the user interface of the application to a foreground of the device's interface.

At block 320, process 300 can present the interface associated with the application on a display of the portable computing device. As shown in stage 215 in FIG. 2, wearable device 200 presents the interface of the application on full screen mode and the application is fully zoomed in and ready for interaction with the user. In some embodiments, only one application can be displayed to the user in the foreground at a time while multiple applications can be pre-launched and suspended in the background. Upon foreground launching the application, the user may now interact with the contents of the application. The user may press the home button or zoom out (e.g., by turning the digital crown counterclockwise) if the user would like to take the application out of the foreground into the background and thereby suspend the application.

Certain embodiments may suspend or remove an at least partially pre-launched application from memory upon receiving an indication that the at least partially pre-launched application is not the application that the user desires to launch. As described, some embodiments pre-launch an application that has been predicted to be an application that a user will likely launch. In some instances however, the user may not actually launch the application that has been predicted to be the desired application. The user may specify to launch another application that is different from the application that was predicted to be the desired application and that was previously pre-launched. For example, although a mail icon previously satisfied a set of pre-launch criteria (e.g., was in the center of the screen for more than a second), the user may start panning again in continuation of his search for another application. Upon detecting the additional panning movement or other indications that the user may not desire to launch the at least partially pre-launched application, the system may determine whether to remove the at least partially pre-launched application from memory.

In some embodiments, the application pre-launch system may remove a pre-launched or partially launched application from working memory (although the application (e.g., corresponding to a centermost icon) has already started pre-launching) when the system determines that the pre-launched or partially pre-launched application is not the application that the user desires to launch. Some embodiments may detect the user's desire to launch a separate application when the system detects additional panning movement from the user or when the system detects a selection of another application to launch. For instance, the user may indicate a desire to launch another application by double tapping another icon that is on the screen, making a voice command, or making a gaze command, etc. The application pre-launch system may then determine whether to stop a partially pre-launched application from fully pre-launching or to remove a pre-launched application from working memory. In some embodiments, the determination can be made based on a number of factors, such as the amount of available resources, whether the application has already been fully pre-launched, the progress of the pre-launch operation if the application has not yet been fully pre-launched, how likely the user will launch this application in the near future, etc.

In some embodiments, the pre-launch process may be aborted if the application has not been fully pre-launched or background launched e.g., upon detecting additional panning movement, upon receiving a command to launch another application. In order to free up resources (e.g., memory and processing power), the pre-launching process can be killed and the partially loaded application (e.g., where a few libraries less than the full amount have been loaded, where the initialization is incomplete) can be removed from memory. Some embodiments may determine whether to stop the pre-launch process based on the degree to which the application has been pre-launched (e.g., stop the pre-launch if the pre-launch is less than 50% complete).

Certain embodiments may determine whether to stop the pre-launch process based on how far off the user has scrolled. For instance, if the icon remains on the screen while the user has continued his panning, the pre-launching process may continue. In some embodiments, if the application that was being pre-launched has been panned to a location off the displayed interface, then the pre-launching process may be aborted or canceled whether or not the application has been fully background launched. In certain embodiments, if the application that was being pre-launched has been moved away from the center of the screen while it is still on the screen, the device may determine whether to cancel the background launch based on whether the application has been fully pre-launched. If the pre-launch has been completed, then the application may be suspended in the background. If the pre-launch has not been completed, then the process for background launching the application may be canceled, returning the application into an unlaunched state (i.e., removed from and not occupying working memory).

If the application that was being pre-launched has been fully pre-launched, then the device may keep the pre-launched application running in the background or suspended without killing the process. In certain embodiments, the device may kill the process in response to receiving the user indication to launch another application. Further, in some embodiments, if the application that was being pre-launched has not been fully pre-launched when the device receives the user indication to launch another application, the device may cease the loading process and start to load the other application into the working memory. Different embodiments may implement these decisions differently. Some embodiments may determine whether to keep a pre-launched application suspended or kill the application based on the monitored usage. For instance, in some embodiments, the kernel may determine to kill a process if the system needs to reclaim additional resources. Instead of spending more time and resources to complete a pre-launching of an application, the system may cancel the background launch and return the application to a completely unlaunched state. In order to prevent wasting additional processing resources, the device may keep a background launched application suspended since the application has already been loaded into working memory.

IV. Sequence for Drawing Application Information on an Icon

Figure 4:
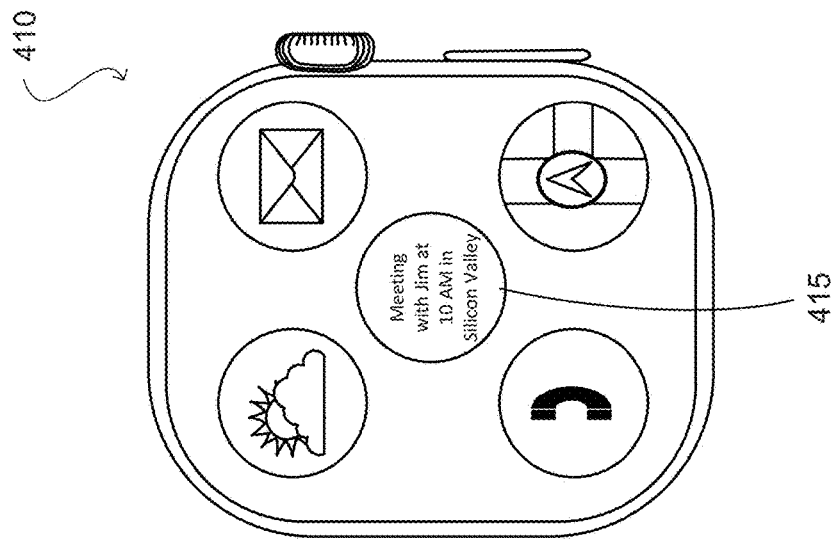
FIG. 4 illustrates example screenshots of displaying icons in a zoomed-in view and then displaying an icon having been "decorated" while the display is in the zoomed-in mode.
Figure 4:
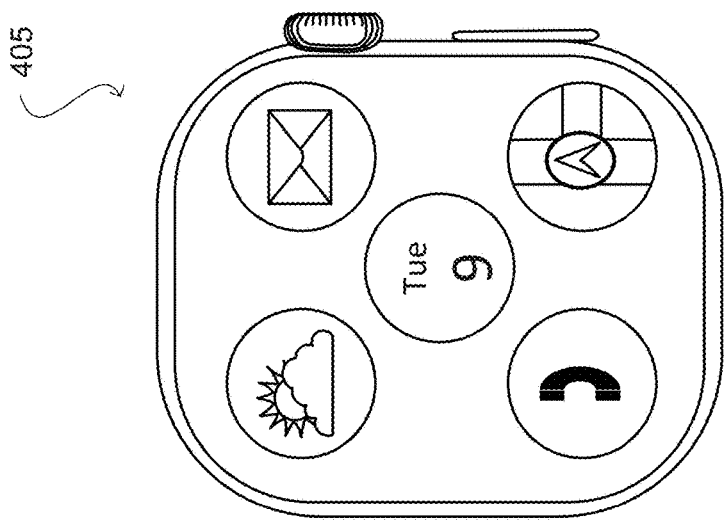

Certain embodiments of the present invention can enter a zoomed-in view (also referred to as a zoomed-in mode) where an icon may be "decorated" with contextual information about an application. FIG. 4 illustrates example screenshots 405 and 410 of displaying icons in a zoomed-in 5-up view and then displaying an icon having been "decorated" while the display is in the zoomed-in 5-up mode. Different embodiments may display a different number of icons zoomed in and may not be limited to five icons. In some embodiments, the zoomed-in view where one or more icons may be "decorated" can be triggered when the zoom level exceeds a threshold level.

Screenshot 405 displays a portion of a collection of icons in a 5-up view when the display is in the 5-up mode. Screenshot 410 shows the center icon 415 being decorated with contextual information from the application. In this example, a calendar icon 415 for a calendar application can show the next appointment on a user's calendar. In some instances, the decorated calendar icon may also other information such as the next appointment after. Another example of a decorated icon can be for a mail icon. The decorated mail icon for a mail application can show the number of unread mails, the times at which the mails were sent, and the senders of those mails.

In some embodiments, the system can determine that the responsibility for drawing the icon can be switched from the system to the application. The determination can be made based on a set of criteria. For instance, the determination can be made to switch the responsibility for drawing the icon to an application when the icon exceeds a threshold size. As described, the application can decorate the icon with contextual information such as a next appointment for a calendar application and a number of e-mails for an e-mail application. In some embodiments, larger sizes above the threshold can lead to more information being displayed on the icon. The system may provide the size (e.g., a zoom level of the icon, a size classification, a number of pixels) to the application so the application can determine the types and amount of information to put into the icon.

Figure 5:
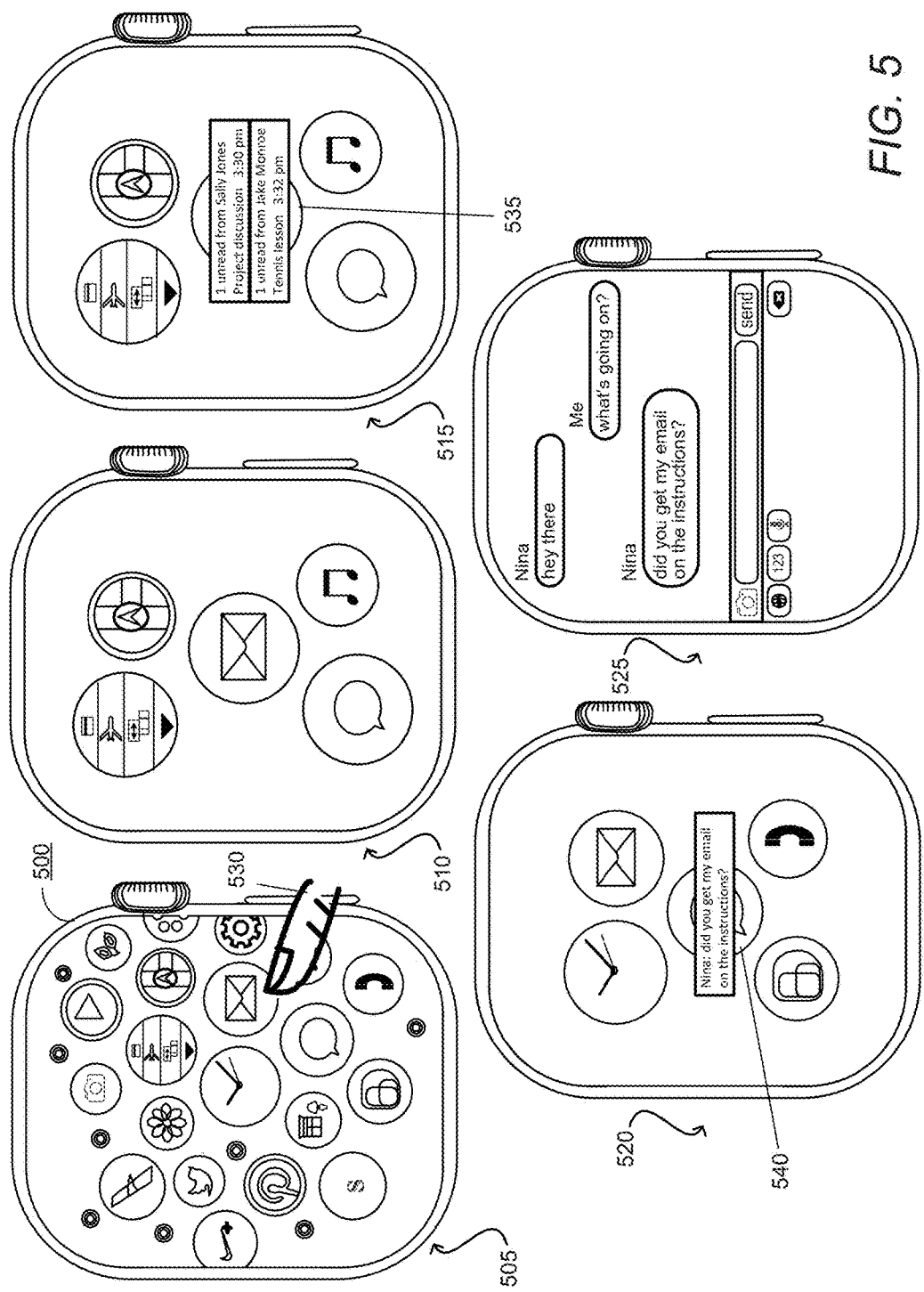
FIG. 5 illustrates an example sequence of transitioning a responsibility of drawing an icon to an application from a system app in accordance with some embodiments of the present invention.

FIG. 5 illustrates an example sequence 505-525 of transitioning the responsibility of drawing an icon on a device 500 from a system app to the application corresponding to the icon in accordance with some embodiments of the present invention. While the system app may be responsible for drawing the icon in some instances, the application itself may be responsible for drawing the icon (also referred to as the contextualized icon) when a set of conditions have been met. In some embodiments, the set of conditions can include an application having been pre-launched and being displayed in the center of a screen. As such, the user may get a preview of pertinent information for that app without having to fully zoom into the app (i.e., foreground launch the app). Some embodiments also enable the user to fluidly pan among the different icons to view the contextual information for each icon. As each icon is panned to the center and pre-launched, the contextual information is displayed as part of the contextualized icon. This enables the user to obtain the desired information from multiple icons quickly and efficiently without having to fully zoom in and out of each application icon.

Stage 505 illustrates a user interface that includes an array of icons being displayed on a home screen of portable computing device 500 in a default state. In the default state, the zoom level for the array of icons can be described as being at zero. The user may zoom out to a universe view where all the icons are visible on the screen, albeit at a smaller size. The user may also zoom into a particular region of the screen to enlarge the icons on the screen.

At this stage, a user may indicate a particular region within the display screen to zoom into (e.g., via a tap at the particular region, via a turning of a crown). Upon receiving a user indication to zoom into a particular region (e.g., via a click, via a turning of the digital crown), the user interface may present the icons in the particular region in a zoomed-in view (e.g., a 5-up view). In this example, a selection via finger 530 has been made to cause the interface to zoom into the selected region. Different embodiments may reach the zoomed-in mode differently. For instance, some embodiments may first zoom into a 10-up view and then zoom into a 5-up view upon receiving an additional user input whereupon a zoomed-in mode is then triggered.

Stage 510 illustrates a user interface that displays the five closest icons to the selected region (also referred to as a 5-up view). The 5-up view may be displayed in response to the user selection of a particular region within the user interface. As mentioned, while this example describes a 5-up view where a contextualized icon mode (in which the contextualized icon(s) may be displayed) is triggered, different embodiments may have a different number of icons zoomed-in when the display is in the contextualized icon mode (also referred to as zoomed-in mode throughout). In some embodiments, the region where the user made the selection may be the new center of the screen. In certain embodiments, the icon closest to the selected region may now reside in the center of the zoom-in 5-up view.

Stage 515 illustrates the center icon 535 decorated by the application represented by the icon. As described, an application can be pre-launched when the application pre-launch criteria have been satisfied. After the application is pre-launched, the application can display the relevant information to the user via a decorated icon. The application can determine the relevant information to present to the user without the application being fully foreground launched. In some embodiments, the relevant information can be a subset of content that is less than the amount of content available if the content were fully launched. In one instance, the decorated icon for a calendar app may display the next appointment on the user's calendar. In another instance, the decorated icon for a mail app may display the subject line and the sender of new emails received since the last time the mail app was launched. In this example, application has determined that multiple new unread notifications have been received. The mail application corresponding to icon 535 generates an icon with application content to present to the user. The "decorated" icon in this example includes unread messages, the sender of the messages, the subject line, and the time the message was sent/received.

Stage 520 illustrates the icons having been panned to the right and the center icon being a different decorated icon. In the zoomed-in mode, the user may pan around and cause the icons to shift in different directions. The user may pan around by selecting a region on the screen (e.g., using a finger or a stylus) and dragging the selection in a direction. As the icons are shifted across the screen, a different icon is in the center of the screen. As shown, the center icon 540 is again decorated by contextual information. In this example, the contextual information includes a newly received text message and its sender. Different applications may generate the "decorated" icon for its associated application differently. Some embodiments allow users or system administrators to customize the contextual information shared when an application is in the zoomed-in mode. As a new icon is shifted to the center of the screen and as the icons have settled, the new icon is the icon that has satisfied the set of criteria for becoming pre-launched and contextualized.

In some embodiments, the previously contextualized icon remains contextualized. In certain embodiments, the previously contextualized icon is reverted back to its original icon form and the application may be either suspended in the background (e.g., depending on how far off the icon has fallen off the screen) or unlaunched altogether (e.g., if the icon has completely fallen off the screen or is no longer visible on the user interface). The user may navigate between different icons and view pertinent information without having to fully zoom into each application. This interaction with the icons enhances the user experience by allowing the user to obtain information from different application quickly. The user no longer needs to fully launch and then zoom out or unlaunch an application and then launch another to be able to obtain the desired information from each application. This allows the user to obtain the desired information while using less memory of the computing system and less processing power.

Stage 525 illustrates the center icon having been fully launched. In some embodiments, the center icon may become fully launched upon a user indication to launch the application. As described, the user indication to launch an application can include a user selection of the corresponding icon. The user indication to launch an application can also include a zoom in command from turning the digital crown or another input component. In this example, the messaging service application is launched. The interface zooms into the application such that the application is presented in full screen. The user may now interact freely with the contents of the application. For example, the user may view the text message communication between the user and another recipient and scroll to earlier text messages if desired. The user may also input a new message by drawing on the blank notepad or by dictating using voice.

In some embodiments, the user may continue to pan around the icons in the zoomed-in view and have access to additional contextualized icons. This enables the user to obtain updated information from various apps without having to foreground launch each application. The user may navigate fluidly between the different icons and be presented with a subset of the information with which the application can present. Not only does this enable the user to efficiently obtain the necessary information, the device can save processing power without having to render the full interface of the application while providing the information that user desires.

Further, some embodiments also enable a user to customize the desired contextual information for each icon. Via a system settings or an app setting, the user may designate the desired information to be displayed when the icon is in pre-launch mode. Some embodiments enable the user to designate different levels and types of information to be displayed depending on a zoom level or a size of the icon. For instance, the contextualized icon may display the calendar appointments for the day when the zoom level of the icon is at 120%. In the instance where the zoom level of the icon is at 160%, the user may specify for the contextualized icon to include only the next appointment.

V. Flow Chart for Drawing Application Information on an Icon

Figure 6:
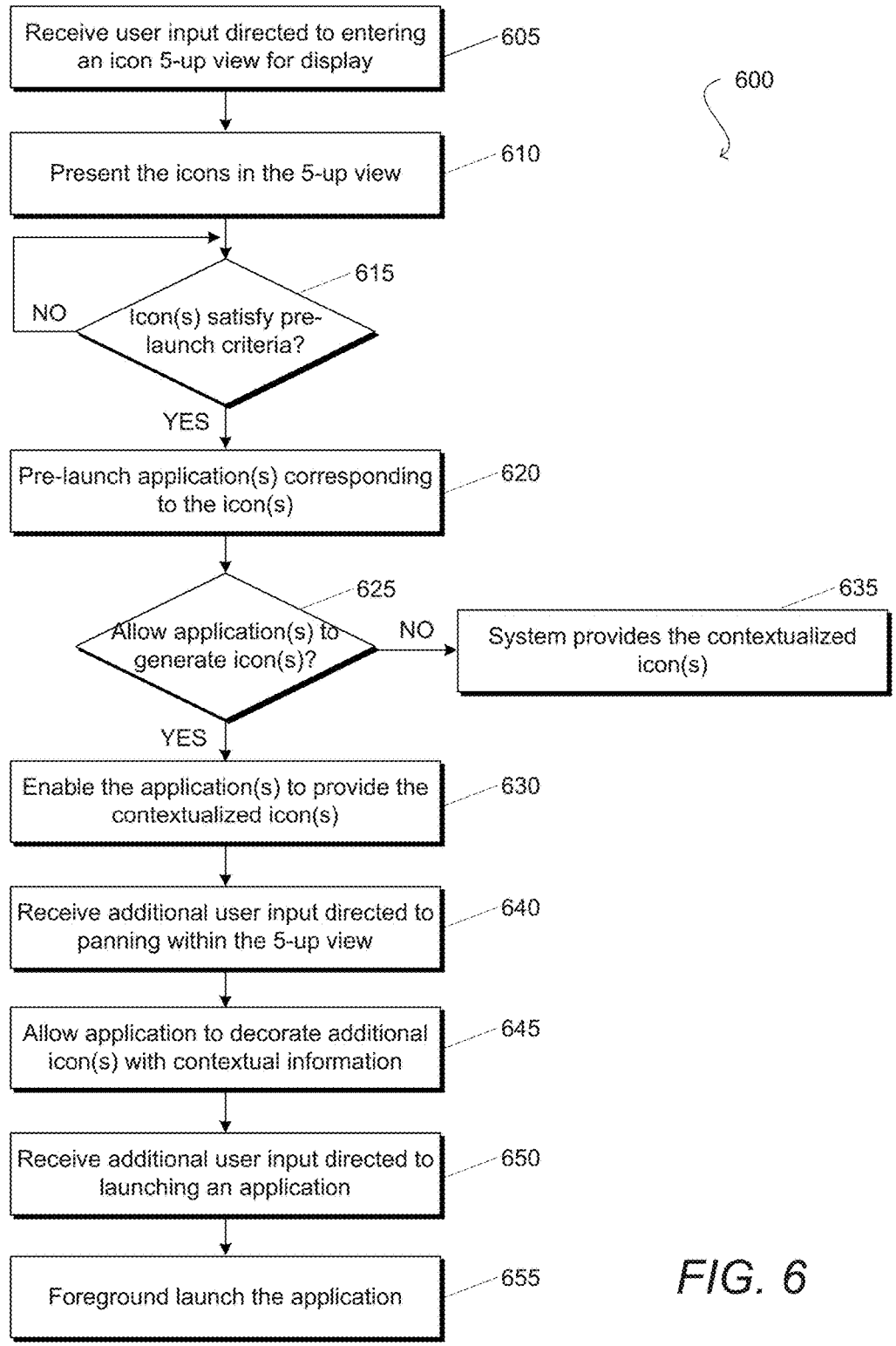
FIG. 6 illustrates an example process for handing off control of drawing an icon from the system to the application in accordance with some embodiments of the present invention.

FIG. 6 illustrates an example process 600 for handing off control of drawing an icon from the system to the application in accordance with some embodiments of the present invention. In some embodiments, the system may determine to hand off control of drawing the icon to the application based on a size of the icon or a position or location of the icon.

At block 605, process 600 can receive a user input directed to entering a zoomed-in mode (e.g., a 5-up mode). In some embodiments, the user interface may switch to zoomed-in mode upon receiving a user indication to zoom into a particular region of the user interface. In certain embodiments, the user may indicate to zoom into a particular region by single- or double-tapping a particular region of the user interface, by scrolling the digital crown in a direction, or by pinch-out zooming at a particular region. In some embodiments, the user may not enter the zoomed-in mode until the user has indicated multiple zoom operations, and in some instances until a threshold zoom level (e.g., 60%) has been reached. As shown in stage 505 in FIG. 5, the user taps on a particular region of the user interface and causes the user interface to zoom into the particular region. As the interface zooms into a region beyond a threshold zoom level, the user interface may enter the zoomed-in mode/view.

At block 610, process 600 can present the icons in a 5-up mode where the 5 icons closest to the selected region is displayed in a zoomed-in mode. In some embodiments, an icon closest to the selected region may be snapped to the center of the screen. In certain embodiments, the system determines any number of icons within a threshold distance or radius (e.g., within a number of pixels) of the selected location and presents those icons zoomed in. Different embodiments may present a different number of icons in the zoomed-in mode. For instance, in some embodiments, the user interface may present seven icons or three icons nearest to the selected region. The icons may be presented at a different zoom level based on the number of icons that are near the selected region. The 5-up mode of the icons near the selected region in stage 510 in FIG. 5 can be seen in stage 510 in FIG. 5.

At block 615, process 600 can determine whether one or more icons have satisfied a set of application pre-launch criteria. In some embodiments, the set of application pre-launch criteria can include a zoom level criterion, a size criterion of the icon, a location criterion of the icon, or a combination thereof. The application pre-launch criteria can be similar to those as described in earlier sections of this disclosure. Process 600 can return to block 615 to determine whether one or more icons have satisfied the set of application pre-launch criteria if no icons have been determined to satisfy the pre-launch criteria.

At block 620, process 600 can pre-launch one or more applications corresponding to the one or more icons upon determining that the application pre-launch criteria have been satisfied for the one or more icons. As described in earlier sections, the pre-launch criteria can be satisfied for an icon when the icon is determined to be the centermost icon in some embodiments. The pre-launch criteria may also be satisfied when an icon is enlarged to a size exceeding a threshold value. In some embodiments, multiple icons within a vicinity or surrounding of the center icon may also be pre-launched. The pre-launched application may be loaded into working memory and ready to be foreground launched. In certain embodiments, pre-launching the application may only require the process to be up and running where it has not performed additional operations other than making sure that the address space and all the libraries are loaded. In some embodiments, the application may be pre-launched without having to connect to the server (e.g., an app server, a graphics server) and/or connect back to the system app for more user presentable information.

At block 625, process 600 can determine whether to allow the system to draw the icons or to allow the application to draw the icon. Some embodiments may determine which entity is responsible for drawing the app based on a set of criteria or conditions. In some embodiments, the device may determine that an individual application may be responsible for drawing the app when a set of criteria have been satisfied. The set of criteria may be satisfied if the application has been pre-launched and the icon is within a region of the screen (e.g., the center of the screen). In certain embodiments, the set of conditions can include the application having been pre-launched, located in the center of the screen or within one-degree of separation from the center icon, and beyond a threshold size or zoom level. Different embodiments may have different conditions that one or more icons need to satisfy before allowing those icons to decorate the icons.

At block 630, process 600 can allow the application to decorate the icon with one or more contextual information items. Upon determining that a set of conditions have been satisfied, the system may allow the application to provide the decorated icon to a display or rendering engine. As the application has been pre-launched, the application may retrieve updated information for the application from an application server. The information can be retrieved from one or more servers from which the application on the device requests data and resources to provide to a user. The information can also be obtained from databases associated with the application, from extensions, from one or more companion devices, from received messages, from notifications, etc. The application may then generate an icon with contextual information using the updated information retrieved from the remote server.

In some embodiments, the application may determine the amount of contextual information to incorporate into the generated icon based on zoom level of the icon and/or a size of the icon (e.g., the number of pixels of a diameter of the icon). In some instances, the system may determine a zoom level, a size of an icon when in the zoomed-in mode, a size of the screen, a number of pixels allotted to the "decorated" icon, or a combination thereof and send this information to the application for the application to generate the icon. Based on this information, the application may determine the amount of contextual information that can fit in the "decorated" icon. If the zoom level is high (e.g., beyond a threshold zoom level, beyond 60%), the application may determine to incorporate more information than if the zoom level were lower. In some embodiments, the application may determine to incorporate less information for an icon than if the icon were of a larger size (e.g., beyond a threshold number of pixels).

At block 635, process 600 can allow the system app to provide the decorated icon in response to determining not to hand off control of drawing the icon to the application. Instead of switching to allow the application to generate a contextualized icon, the system retains control in generating the icon. The system may decorate the icon with any information that the system may obtain, such as the number of notifications received. The system app may provide the icon to the display or rendering engine for display.

At block 640, process 600 can receive additional user input directed to panning within the zoomed-in mode. Some embodiments enable the user to perform a panning operation while the icons are displayed in the zoomed-in mode. This allows the user to navigate among the icons and obtain the desired contextual information from each application without requiring the user to fully foreground launch each application. As the user pans across the icons displayed in the zoomed-in mode, icons that were adjacent to the selected region may appear on the user interface as other icons may fall off the user interface. The user may also pan the screen slightly to the left such that the icon previously on the right hand side of the screen is now in the center.

At block 645, process 600 can allow application to decorate additional icons with contextual information. In some embodiments, all the icons displayed within the zoomed-in mode (e.g., 5-up mode) may be pre-launched. By pre-launching these applications, the system may cause the applications to decorate their icons quicker such that the user may easily pan across the icons and preview relevant information. By panning fluidly across the different icons and causing different icons to settle in the center, the icon settled in the center may be decorated with contextual information. As such, the user may obtain the desired information from each application easily by shifting those applications to the center in the zoomed-in mode.

At block 650, process 600 can receive additional user input directed to launching an application. In some embodiments, a selection of the center icon may cause the corresponding application to launch in the foreground. In certain embodiments, the user may turn the digital crown to cause the center icon to be further zoomed in and foreground launched when the zoom level has exceeded a threshold. In some embodiments, the user may select another icon that is not in the center to be launched, e.g., via a double-tap.

At block 655, process 600 can foreground launch the application. As described, when the application is foreground launched, the application interface may occupy the entire screen of the device. The user may then proceed to interact with the contents of the application. Some embodiments may allow the user to return to the zoomed-in mode (e.g., 5-up mode) after the user has foreground launched an application. In certain embodiments, the application may be suspended in the background launch phase if the application has already been pre-launched or background launched. In some embodiments, the application is not removed from its background launched state until another application is being pre-launched or launched.

VI. Portable Computing Device

Figure 7:
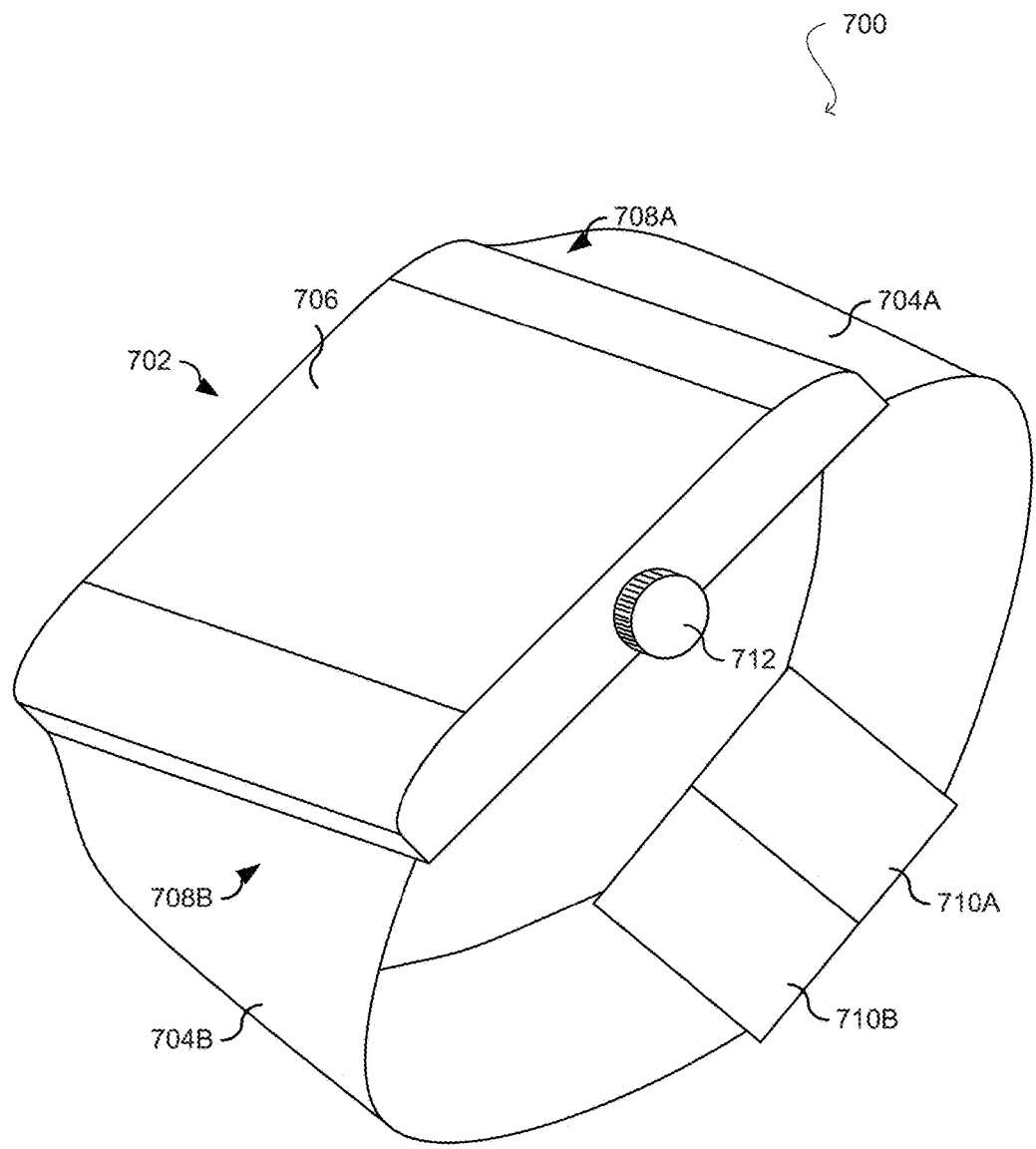
FIG. 7 shows wearable device for preemptively launching one or more applications according to some embodiments of the present invention.

Embodiments described herein may take the form of, be incorporated in, or operate with a suitable electronic device. One example of such a device is shown in FIG. 7 and takes the form of a wearable mechanism (e.g., the wearable device 200 of FIG. 2 or another type of smart device). Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

FIG. 7 shows wearable device 700 for preemptively launching (also referred to as background launching or pre-launching) one or more applications according to some embodiments of the present invention. In this example, wearable device 700 is shown as a wristwatch-like device with a face portion 702 connected to straps 704A, 704B. In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Face portion 702 can include, e.g., a touchscreen display 706 that can be appropriately sized depending on where on a user's person wearable device 700 is intended to be worn. A user can view information presented by wearable device 700 on touchscreen display 706 and provide input to wearable device 700 by touching touchscreen display 706. In some embodiments, touchscreen display 706 can occupy most or all of the front surface of face portion 702.

Straps 704A, 704B can be provided to allow wearable device 700 to be removably worn by a user, e.g., around the user's wrist, and secured thereto. In some embodiments, straps 704A, 704B can be made of any flexible material (e.g., fabrics, flexible plastics, leather, chains or flexibly interleaved plates or links made of metal or other rigid materials) and can be connected to face portion 702, e.g., by hinges. Alternatively, straps 704A, 704B can be made of a rigid material, with one or more hinges positioned at the junction of face 702 and proximal ends 708A, 708B of straps 704A, 704B and/or elsewhere along the lengths of straps 704A, 704B to allow a user to put on and take off wearable device 700. Different portions of straps 704A, 704B can be made of different materials; for instance, flexible or expandable sections can alternate with rigid sections. In some embodiments, one or both of straps 704A, 704B can include removable sections, allowing wearable device 700 to be resized to accommodate a particular user's wrist size. In some embodiments, straps 704A, 704B can be portions of a continuous strap member that runs behind or through face portion 702. Face portion 702 can be detachable from straps 704A, 704B; permanently attached to straps 704A, 704B; or integrally formed with straps 704A, 704B.

The distal ends of straps 704A, 704B opposite face portion 702 can provide complementary clasp members 710A, 710B that can be engaged with each other to secure the distal ends of straps 704A, 704B to each other, forming a closed loop. In this manner, device 700 can be secured to a user's person, e.g., around the user's wrist; clasp members 710A, 710B can be subsequently disengaged to facilitate removal of device 700 from the user's person. The design of clasp members 710A, 710B can be varied; in various embodiments, clasp members 710A, 710B can include buckles, magnetic clasps, mechanical clasps, snap closures, etc. In some embodiments, one or both of clasp members 710A, 710B can be movable along at least a portion of the length of corresponding strap 704A, 704B, allowing wearable device 700 to be resized to accommodate a particular user's wrist size.

Straps 704A, 704B can be two distinct segments, or they can be formed as a continuous band of an elastic material (including, e.g., elastic fabrics, expandable metal links, or a combination of elastic and inelastic sections), allowing wearable device 700 to be put on and taken off by stretching a band formed straps 704A, 704B. In such embodiments, clasp members 710A, 710B can be omitted.

Straps 704A, 704B and/or clasp members 710A, 710B can include sensors that allow wearable device 700 to determine whether it is being worn at any given time. Wearable device 700 can operate differently depending on whether it is currently being worn or not. For example, wearable device 700 can inactivate various user interface and/or RF interface components when it is not being worn. In addition, in some embodiments, wearable device 700 can notify a companion device (e.g., a smartphone, a mobile device, a tablet device, a media player, a speaker, or other electronic devices) when a user puts on or takes off wearable device 700.

In various embodiments, wearable device 700 includes a rotary input such as a crown 712 (also referred to as digital crown throughout the specification). Crown 712 can be used to perform a variety of functions. In some embodiments, crown 712 provides rotation input for navigating content (e.g., zooming in and out of content, panning across content). In this example, crown 712 includes a plastic or metal crown body, preferably having conventional outer teeth. Typically, a pedestal made integral with the body of crown 715 is positioned and protrudes into face portion 702. Crown 712 may be fastened, either permanently or removably, to hardware associated with wearable device 700. Rotation of the crown (and/or a stem) may be sensed optically, electrically, magnetically, or mechanically. Further, in some embodiments the crown (and/or stem) may also move laterally, thereby providing a second type of input to the device.

Wearable device 700 may likewise include one or more buttons (not shown here). The button(s) may be depressed to provide yet another input to the device. In various embodiments, the button may be a dome switch, rocker switch, electrical contact, magnetic switch, and so on. In some embodiments the button may be waterproof or otherwise sealed against the environment.

It will be appreciated that wearable device 700 is illustrative and that variations and modifications are possible. For example, wearable device 700 can be implemented in any wearable article, including a watch, a bracelet, a necklace, a ring, a belt, a jacket, or the like. In some instances, wearable device 700 can be a clip-on device or pin-on device that has a clip or pin portion that attaches to the user's clothing. The interface portion (including, e.g., touchscreen display 706) can be attached to the clip or pin portion by a retractable cord, and a user can easily pull touchscreen display 706 into view for use without removing the clip or pin portion, then let go to return wearable device 700 to its resting location. Thus, a user can wear wearable device 700 in any convenient location.

Figure 8:
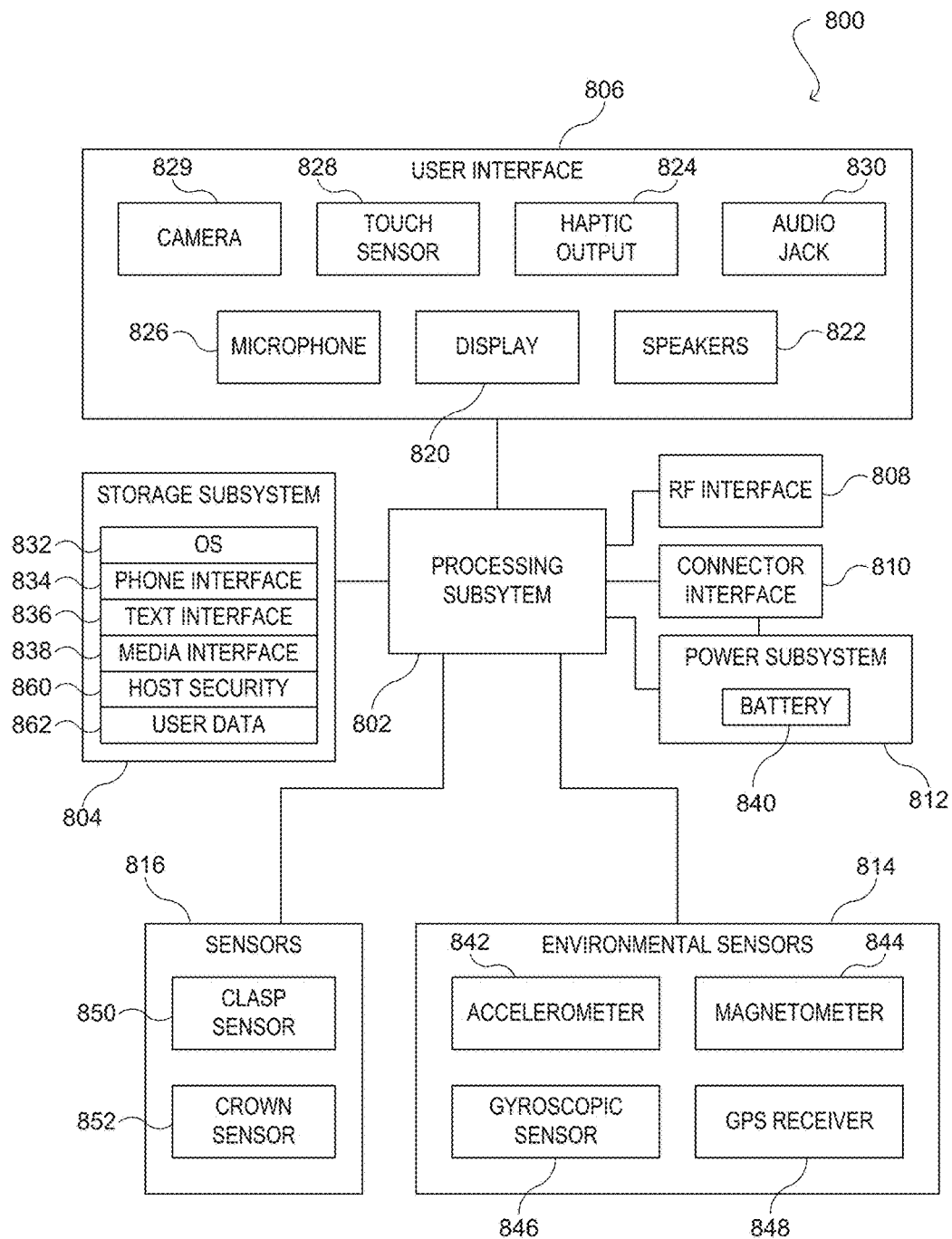
FIG. 8 is a simplified block diagram of the wearable device of FIG. 7 according to one embodiment.

Wearable device 700 can be implemented using electronic components disposed within face portion 702, straps 704A, 704B, and/or clasp members 710A, 710B. FIG. 8 is a simplified block diagram of wearable device 800 (e.g., implementing wearable device 700) according to an embodiment of the present invention. Wearable device 800 can include processing subsystem 802, storage subsystem 804, user interface 806, RF interface 808, connector interface 810, power subsystem 812, environmental sensors 814, and strap sensors 816. Wearable device 800 can also include other components (not explicitly shown).

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 804 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 804 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 804 can also store one or more application programs to be executed by processing subsystem 802 (e.g., video game programs, personal information management programs, media playback programs, interface programs associated with particular host devices and/or host device functionalities, etc.).

User interface 806 can include any combination of input and output devices. A user can operate input devices of user interface 806 to invoke the functionality of wearable device 800 and can view, hear, and/or otherwise experience output from wearable device 800 via output devices of user interface 806.

Examples of output devices include display 820, speakers 822, and haptic output generator 824. Display 820 can be implemented using compact display technologies, e.g., LCD (liquid crystal display), LED (light-emitting diode), OLED (organic light-emitting diode), or the like. In some embodiments, display 820 can incorporate a flexible display element or curved-glass display element, allowing wearable device 800 to conform to a desired shape. One or more speakers 822 can be provided using small-form-factor speaker technologies, including any technology capable of converting electronic signals into audible sound waves. In some embodiments, speakers 822 can be used to produce tones (e.g., beeping or ringing) and can but need not be capable of reproducing sounds such as speech or music with any particular degree of fidelity. Haptic output generator 824 can be, e.g., a device that converts electronic signals into vibrations; in some embodiments, the vibrations can be strong enough to be felt by a user wearing wearable device 800 but not so strong as to produce distinct sounds.

Wearable device 800 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Examples of input devices include microphone 826, touch sensor 828, and camera 829. Microphone 826 can include any device that converts sound waves into electronic signals. In some embodiments, microphone 826 can be sufficiently sensitive to provide a representation of specific words spoken by a user; in other embodiments, microphone 826 can be usable to provide indications of general ambient sound levels without necessarily providing a high-quality electronic representation of specific sounds.

Touch sensor 828 can include, e.g., a capacitive sensor array with the ability to localize contacts to a particular point or region on the surface of the sensor and in some instances, the ability to distinguish multiple simultaneous contacts. In some embodiments, touch sensor 828 can be overlaid over display 820 to provide a touchscreen interface, and processing subsystem 802 can translate touch events (including taps and/or other gestures made with one or more contacts) into specific user inputs depending on what is currently displayed on display 820. In some embodiments, touch sensor 828 can also determine a location of a touch on the cover glass.

A touch sensor may be incorporated into or on the display stack in order to determine a location of a touch. The touch sensor may be self-capacitive in certain embodiments, mutual-capacitive in others, or a combination thereof.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Camera 829 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 804 and/or transmitted by wearable device 800 to other devices for storage. Depending on implementation, the optical components can provide fixed focal distance or variable focal distance; in the latter case, autofocus can be provided. In some embodiments, camera 829 can be disposed along an edge of face portion 702 of FIG. 7, e.g., the top edge, and oriented to allow a user to capture images of nearby objects in the environment such as a bar code or QR code. In other embodiments, camera 829 can be disposed on the front surface of face member 702 of FIG. 7, e.g., to capture images of the user. Zero, one, or more cameras can be provided, depending on implementation.

In some embodiments, user interface 806 can provide output to and/or receive input from an auxiliary device such as a headset. For example, audio jack 830 can connect via an audio cable (e.g., a standard 2.5-mm or 3.5-mm audio cable) to an auxiliary device. Audio jack 830 can include input and/or output paths. Accordingly, audio jack 830 can provide audio to the auxiliary device and/or receive audio from the auxiliary device. In some embodiments, a wireless connection interface can be used to communicate with an auxiliary device.

Processing subsystem 802 can be implemented as any electronic device capable of processing, receiving, or transmitting data or instructions. Processing subsystem 802 can include one or more integrated circuits. For example, processing subsystem 802 may include one or more of: one or more single-core or multi-core microprocessors or microcontrollers, a central processing unit (CPU), an application-specific integrated circuit (ASIC), a digital signal processor (DSP), or additional or combinations of such devices. In operation, processing subsystem 802 can control the operation of wearable device 800. In various embodiments, processing subsystem 802 can execute a variety of programs in response to program code and can maintain multiple concurrently executing programs or processes. At any given time, some or all of the program code to be executed can be resident in processing subsystem 802 and/or in storage media such as storage subsystem 804.

Through suitable programming, processing subsystem 802 can provide various functionality for wearable device 800. For example, in some embodiments, processing subsystem 802 can execute an operating system (OS) 832 and various applications for interfacing with a host device, such as a phone-interface application 834, a text-interface application 836, and/or a media interface application 838. In some embodiments, some or all of these application programs can interact with a host device, e.g., by generating messages to be sent to the host device and/or by receiving and interpreting messages from the host device. In some embodiments, some or all of the application programs can operate locally to wearable device 800. For example, if wearable device 800 has a local media library stored in storage subsystem 804, media interface application 838 can provide a user interface to select and play locally stored media items. Examples of interface applications are described below.

In some embodiments, processing subsystem 802 can also execute a host security process 860 that provides support for establishing and maintaining a verified communication session with a host device. A verified communication session can provide an enhanced level of security, and various operations of wearable device 800 and/or a host device can be made conditional on whether a verified communication session between the devices is in progress. For instance, host security process 860 can facilitate unlocking a host device when wearable device 800 is present, depending on whether a verified session is in progress. User data 862 can include any information specific to a user, such as identification information, user-specified settings and preferences, customized information (e.g., contacts, predefined text messages), and any other user-related data or content. In some embodiments, executing applications and processes can access user data 862 to facilitate operations.

RF (radio frequency) interface 808 can allow wearable device 800 to communicate wirelessly with various host devices. RF interface 808 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 808 can be implemented using a combination of hardware (e.g., driver circuits, antennas, modulators/demodulators, encoders/decoders, and other analog and/or digital signal processing circuits) and software components. In some embodiments, RF interface 808 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 808. Wearable device 800 may wirelessly communicate with a sales terminal nearby, thus permitting a user to quickly and efficiently conduct a transaction such as selling, buying, or returning a good. Wearable device 800 may use NFC technology to perform these and other functions.

Connector interface 810 can allow wearable device 800 to communicate with various host devices via a wired communication path, e.g., using Universal Serial Bus (USB), universal asynchronous receiver/transmitter (UART), or other protocols for wired data communication. In some embodiments, connector interface 810 can provide a power port, allowing wearable device 800 to receive power, e.g., to charge an internal battery. For example, connector interface 810 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

In some embodiments, connector interface 810 and/or RF interface 808 can be used to support synchronization operations in which data is transferred from a host device to wearable device 800 (or vice versa). For example, as described below, a user can customize certain information for wearable device 800 (e.g., a "favorite" contacts list and/or specific predefined text messages that can be sent). While user interface 806 can support data-entry operations, a user may find it more convenient to define customized information on a separate device (e.g., a tablet or smartphone) that has a larger interface (e.g., including a real or virtual alphanumeric keyboard), then transfer the customized information to wearable device 800 via a synchronization operation. Synchronization operations can also be used to load and/or update other types of data in storage subsystem 804, such as media items, application programs, and/or operating system programs. Synchronization operations can be performed in response to an explicit user request and/or automatically, e.g., when wireless device 800 resumes communication with a particular host device or in response to either device receiving an update to its copy of synchronized information.

Environmental sensors 814 can include various electronic, mechanical, electromechanical, optical, or other devices that provide information related to external conditions around wearable device 800. Sensors 814 in some embodiments can provide digital signals to processing subsystem 802, e.g., on a streaming basis or in response to polling by processing subsystem 802 as desired. Any type and combination of environmental sensors can be used; shown by way of example are accelerometer 842, a magnetometer 844, a gyroscope sensor 846, and a GPS receiver 848.

Some environmental sensors can provide information about the location and/or motion of wearable device 800. For example, accelerometer 842 can sense acceleration (relative to freefall) along one or more axes, e.g., using piezoelectric or other components in conjunction with associated electronics to produce a signal. Magnetometer 844 can sense an ambient magnetic field (e.g., Earth's magnetic field) and generate a corresponding electrical signal, which can be interpreted as a compass direction. Gyroscopic sensor 846 can sense rotational motion in one or more directions, e.g., using one or more MEMS (micro-electro-mechanical systems) gyroscopes and related control and sensing circuitry. Global Positioning System (GPS) receiver 848 can determine location based on signals received from GPS satellites.

Other sensors can also be included in addition to or instead of these examples. For example, a sound sensor can incorporate microphone 826 together with associated circuitry and/or program code to determine, e.g., a decibel level of ambient sound. Temperature sensors, proximity sensors, ambient light sensors, or the like can also be included. The ambient light sensor may permit the device to sense a brightness of its environment and adjust certain operational parameters accordingly. For example, wearable device 800 may modify a brightness of a display in response to the sensed ambient light. As another example, wearable device 800 may turn the display off if little or no light is sensed for a period of time.

Sensors 816 can include various electronic, mechanical, electromechanical, optical, or other devices that provide information to wearable device 800. For instance, clasp sensor 850 can be at least partially disposed within either or both of clasp members 710A, 710B of FIG. 7 and can detect when clasp members 710A, 710B are engaged with each other or disengaged from each other. For example, engaging clasp members 710A, 710B to each other can complete an electrical circuit, allowing current to flow through clasp sensor 850; disengaging clasp members 710A, 710B from each other can break the circuit. As another example, one or more crown sensors 852 can be disposed to detect input from crown 712 of FIG. 7. Crown sensors 852 can also include motion sensors, accelerometers, pressure sensors (e.g., piezoelectric devices), or the like.

Any other type of sensor can be used in addition to or instead of strap sensors 816 and crown sensors 852. For instance, physiological or biometric sensors, such as pulse sensors, ECG sensors, or the like can be provided. In some embodiments, physiological sensors can monitor a user's physiological signals and provide health-related information based on those signals. In certain embodiments, physiological or biometric sensors can be used in verifying the identity of the wearer of wearable device 800.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Similarly, wearable device 800 may include a force sensor (not shown here) to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Power subsystem 812 can provide power and power management capabilities for wearable device 800. For example, power subsystem 812 can include a battery 840 (e.g., a rechargeable battery) and associated circuitry to distribute power from battery 840 to other components of wearable device 800 that require electrical power. In some embodiments, power subsystem 812 can also include circuitry operable to charge battery 840, e.g., when connector interface 810 is connected to a power source. In some embodiments, power subsystem 812 can include a "wireless" charger, such as an inductive charger, to charge battery 840 without relying on connector interface 810. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 812 can also include other power sources, such as a solar cell, in addition to or instead of battery 840.

In some embodiments, power subsystem 812 can control power distribution to components within wearable device 800 to manage power consumption efficiently. For example, power subsystem 812 can automatically place device 800 into a "hibernation" state when strap sensors 816 indicate that device 800 is not being worn. The hibernation state can be designed to reduce power consumption; accordingly, user interface 806 (or components thereof), RF interface 808, connector interface 810, and/or environmental sensors 814 can be powered down (e.g., to a low-power state or turned off entirely), while strap sensors 816 are powered up (either continuously or at intervals) to detect when a user puts on wearable device 800. As another example, in some embodiments, while wearable device 800 is being worn, power subsystem 812 can turn display 820 and/or other components on or off depending on motion and/or orientation of wearable device 800 detected by environmental sensors 814. For instance, if wearable device 800 is designed to be worn on a user's wrist, power subsystem 812 can detect raising and rolling of a user's wrist, as is typically associated with looking at a wristwatch, based on information provided by accelerometer 842. In response to this detected motion, power subsystem 812 can automatically turn display 820 and/or touch sensor 828 on; similarly, power subsystem 812 can automatically turn display 820 and/or touch sensor 828 off in response to detecting that user's wrist has returned to a neutral position (e.g., hanging down).

Power subsystem 812 can also provide other power management capabilities, such as regulating power consumption of other components of wearable device 800 based on the source and amount of available power, monitoring stored power in battery 840, generating user alerts if the stored power drops below a minimum level, and so on.

In some embodiments, control functions of power subsystem 812 can be implemented using programmable or controllable circuits operating in response to control signals generated by processing subsystem 802 in response to program code executing thereon, or as a separate microprocessor or microcontroller.

It will be appreciated that wearable device 800 is illustrative and that variations and modifications are possible.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
   at a portable computing device having a display, a working memory, and one or more processors:
   displaying a plurality of icons in a two dimensional array on the display;
   receiving, at the display, a panning gesture to move the two dimensional array such that positions of the plurality of icons move together across the display;
   determining positions of the plurality of icons;
   determining that an icon of the plurality of icons has satisfied one or more application pre-launch criteria, the application pre-launch criteria including a position of the icon being within a specified region around a center of the display;
   pre-launching an application corresponding to the icon, wherein pre-launching the application includes loading the application into the working memory while not presenting an application interface associated with the application on the display of the portable computing device;
   receiving a user input corresponding to a selection of the icon; and
   in response to and after receiving the user input corresponding to the selection of the icon:
   presenting the application interface or a preview of content interface associated with the application on the display of the portable computing device using the application loaded into the working memory,
   wherein the application interface and preview of content interface associated with the application are different than the icon.

2. The method of claim 1 wherein the one or more application pre-launch criteria further includes the icon having a size exceeding a threshold value.

3. The method of claim 1 wherein the determining is performed when the panning gesture has ceased.

4. The method of claim 1 wherein the one or more application pre-launch criteria have been satisfied for the icon upon determining that the icon has been within the specified region of the display for beyond a threshold time interval.

5. The method of claim 1 wherein the one or more application pre-launch criteria is determined to have been satisfied for the icon when the icon has been detected to enter the specified region.

6. The method of claim 1 wherein pre-launching the application includes retrieving information items from an application server pertaining to updates compared to a last time the application was launched.

7. The method of claim 1 wherein the portable computing device is a watch.

8. The method of claim 1 further comprising:
receiving a user indication to enter a zoomed-in view for a set of icons;
displaying the set of icons in the zoomed-in view on the display;
determining that a subset of the icons have satisfied a set of conditions;
determining contextual information associated with each of the subset of the icons upon determining that the subset of the icons have satisfied the set of conditions;
displaying the subset of the icons with the contextual information.

9. The method of claim 8 wherein the set of conditions includes the subset of the icons being within the specified region of the display and exceeding at least one of a threshold zoom level or a threshold size.

10. The method of claim 1 further comprising:
in response to determining that a set of conditions have been satisfied for the icon, enabling the application corresponding to the icon to generate a contextualized icon, wherein the icon is generated by an operating system of the portable computing device prior to the set of conditions having been satisfied.

11. A computer product comprising a non-transitory computer readable medium storing a plurality of instructions for pre-launching an application, the instructions comprising:
displaying a plurality of icons in a two dimensional array on the display;
receiving, at the display, a panning gesture to move the two dimensional array such that positions of the plurality of icons move together across the display;
determining positions of the plurality of icons;
determining that an icon of the plurality of icons has satisfied one or more application pre-launch criteria, the application pre-launch criteria including a position of the icon being within a specified region around a center of a display of a portable computing device;
pre-launching the application corresponding to the icon, wherein pre-launching the application includes loading the application into working memory while not presenting an application interface associated with the application on the display of the portable computing device;
receiving a user input corresponding to a selection of the icon; and
in response to and after receiving the user input corresponding to the selection of the icon:
presenting the application interface or a preview of content interface associated with the application on the display of the portable computing device using the application loaded into a working memory,
wherein the application interface and preview of content interface associated with the application are different than the icon.

12. The computer product of claim 11 wherein the application pre-launch criteria further includes the icon having a size exceeding a threshold value.

13. The computer product of claim 11 wherein the determining is performed when the panning gesture has ceased and when the array of icons are settled into specific grid locations.

14. The computer product of claim 11 wherein the one or more pre-launch criteria have been satisfied for the icon upon determining that the icon has been within the specified region of the display for beyond a threshold time interval.

15. The computer product of claim 11 wherein the one or more application pre-launch criteria is determined to have been satisfied for the icon when the icon has been detected to enter the specified region.

16. The computer product of claim 11 wherein pre-launching the application includes retrieving information items from an application server pertaining to updates compared to a last time the application was launched.

17. The computer product of claim 11 wherein the instructions further comprise:
receiving a user indication to enter a zoomed-in view for a set of icons;
displaying the set of icons in the zoomed-in view on the display;
determining that a subset of the icons have satisfied a set of conditions;
determining contextual information associated with each of the subset of the icons upon determining that the subset of the icons have satisfied the set of conditions;
displaying the subset of the icons with the contextual information.

18. The computer product of claim 17 wherein the set of conditions includes the subset of the icons being within the specified region of the display and exceeding at least one of a threshold zoom level or a threshold size.

19. The computer product of claim 11 wherein the instructions further comprise:
in response to determining that a set of conditions have been satisfied for the icon, enabling the application corresponding to the icon to generate a contextualized icon, wherein the icon is generated by an operating system of the portable computing device prior to the set of conditions having been satisfied.

20. The computer product of claim 11 further comprising one or more processors for executing the plurality of instructions for pre-launching the application.

21. A method comprising:
at a portable computing device having a display, a working memory, and one or more processors:
displaying a plurality of icons in a two dimensional array on the display;
receiving, at the display, a panning gesture to move the two dimensional array such that positions of the plurality of icons move together across the display;
determining positions of the plurality of icons;
determining that an icon of the plurality of icons has satisfied one or more application pre-launch criteria, the application pre-launch criteria including a position of the icon being moved within a specified region around a center of the display;
pre-launching an application corresponding to the icon, wherein pre-launching the application includes loading the application in the working memory, the loaded application configured for background execution;

receiving a user input corresponding to a selection of the icon; and in response to and after receiving the user input corresponding to the selection of the icon, presenting an application interface for the loaded application in a foreground.

* * * * *